United States Patent [19]
Bailey

[11] Patent Number: 6,061,194
[45] Date of Patent: May 9, 2000

[54] DEVICE AND METHOD FOR STORING AND RETRIEVING ORIGINAL AND REDUNDANT DATA

[75] Inventor: Wayne P. Bailey, Longmont, Colo.

[73] Assignee: LSI Logic Corporation, Milpitas, Calif.

[21] Appl. No.: 08/843,419

[22] Filed: Apr. 15, 1997

[51] Int. Cl.$^7$ ..................................................... G11B 5/09
[52] U.S. Cl. ............................................... 360/47; 360/63
[58] Field of Search ................................. 360/47, 31, 49, 360/61, 106, 48, 63, 15

[56] References Cited

U.S. PATENT DOCUMENTS

| | | | |
|---|---|---|---|
| 3,729,725 | 4/1973 | Denney et al. | ............................ 360/47 |
| 4,862,411 | 8/1989 | Dishon et al. . | |
| 5,083,229 | 1/1992 | Frey, Jr. . | |
| 5,223,993 | 6/1993 | Squires et al. . | |
| 5,293,282 | 3/1994 | Squires . | |
| 5,341,351 | 8/1994 | Ng . | |
| 5,390,313 | 2/1995 | Yanai et al. . | |
| 5,422,761 | 6/1995 | Anderson et al. | ........................ 360/47 |
| 5,422,762 | 6/1995 | Jerbic . | |
| 5,463,758 | 10/1995 | Ottesen . | |

FOREIGN PATENT DOCUMENTS

| | | | |
|---|---|---|---|
| 55-84052 | 6/1980 | Japan | ........................................ 360/47 |
| 1-223667 | 9/1989 | Japan | ........................................ 360/47 |
| 4372776 | 12/1992 | Japan . | |
| 5290515 | 11/1993 | Japan . | |
| 7169195 | 7/1995 | Japan . | |

*Primary Examiner*—Andrew L. Sniezek
*Assistant Examiner*—Alan Faber

[57] ABSTRACT

A storage device is described for reading data from a hard disk drive wherein delays due to rotational latency are substantially reduced. The storage device includes a platter having a substantially planar annular surface with a geometrical center. On the platter are a plurality of generally arcuate concentric tracks. Each of the tracks is divided into a plurality of sectors that are radially outwardly disposed from the geometrical center of the platter and are bounded by radii extending from the geometrical center. Original data is written on at least one of the sectors. Further, a copy of the original data is maintained at a fixed azimuth angle from the original data during rotation of the platter about the center.

2 Claims, 5 Drawing Sheets

DEVICE AND METHOD FOR STORING AND RETRIEVING ORIGINAL AND REDUNDANT DATA

FIELD OF THE INVENTION

The present invention relates to disk storage devices for data, and in particular to a device and a method for storing data which reduces the amount of time required to retrieve the data.

BACKGROUND OF THE INVENTION

Architects of high-performance computers and other electronic devices have long been forced to acknowledge the existence of a large gap between the speed of the central processing unit (CPU) and the speed of attached mass storage devices such as magnetic hard disk drives.

In contrast to primary memory technologies, the performance of reading data from conventional magnetic disk drives and other such mass storage devices has improved only modestly. In these mechanical devices, the delays in retrieving stored data are dominated primarily by seek and rotation delays.

For devices such as disk drives, data is stored on a data storage platter having a plurality of concentric tracks. The data on each track is further divided into arcuate sectors.

A read/write head is used to read the data. The data is read by moving the head over a particular track and scanning the sector(s) containing the data.

In such read operations, it is often necessary to move the head to new locations in search of sectors containing specific data items. Such relocations are usually time-consuming. The access time ($\tau_a$) is defined as the average time spent in going from one randomly selected spot on the disk to another. $\tau_a$ can be considered the sum of a seek time ($\tau_s$), which is the average time needed to acquire the target track, and a latency ($\tau_l$), which is the average time spent on the target track waiting for the desire sector. Thus, $$\tau_a = \tau_s + \tau_l$$

Currently, in prior art devices, the latency is half the resolution period of the disk since a randomly selected sector is, on the average, halfway along the track from the point where the head initially lands. Thus, for a disk rotating at 1200 rpm $\tau_l$=25 ms, while at 3600 rpm $\tau_l$≈8.3 ms. The seek time, on the other hand, is independent of the rotation speed, but is determined by the traveling distance of the head during an average seek, as well as by the mechanism of head actuation.

Due to cost constraints and reliability concerns, it is not feasible to construct a disk having a speed greater than 7,200 rpm and, in fact, most drives today operate at 3,600 rpm. However, as stated above, there is a need to increase disk drive performance in order to satisfy the demands of today's higher performance computers.

The present invention satisfies the above-discussed problems using two or more heads for reading data that is redundantly stored in various locations offset from each other.

SUMMARY OF THE INVENTION

The present invention provides a disk storage device and method wherein rotational latency is substantially reduced.

The structure embodying the present invention is especially suitable for applications wherein data is stored on a relatively moving recording medium, for example, a rotational platform such as a magnetic disk, platter, or the like. The present invention provides for redundantly storing the data on storage medium locations that are angularly offset from each other. The data is retrieved by accessing the location containing the data that is closest to a read/write head. As such, the time required to read data from the disk is reduced by decreasing delays due to rotational latency.

The storage device embodying the present invention preferably includes a rotatable data storage platter having a substantially planar surface with a geometrical center. On the platter are a plurality of generally arcuate concentric tracks. Each of the tracks is divided into a plurality of sectors that are radially outwardly disposed from the geometrical center of the platter and are bounded by radii extending from the geometrical center. Original data is written on at least one of the sectors. Further, a copy of the original data is maintained at a fixed azimuth angle from the original data.

BRIEF DESCRIPTION OF THE DRAWINGS

In the accompanying drawings that form part of the specification, and in which like numerals are employed to designate like elements throughout the same.

DESCRIPTION OF THE PREFERRED EMBODIMENTS

The present invention provides a storage device and a method for storing data on a relatively movable storage medium wherein the time spent waiting to retrieve data is reduced. The invention is eminently well suited for use with a rotatable data storage platter having a substantially planar surface. On the platter are a plurality of generally arcuate concentric tracks that are further divided by radii extending outwardly from the platter's center into sectors. Original data is written on at least one of the sectors. In addition, a substantially redundant copy of the original data is maintained at a fixed azimuth angle from the original data as the platter is rotated.

Figure 1:
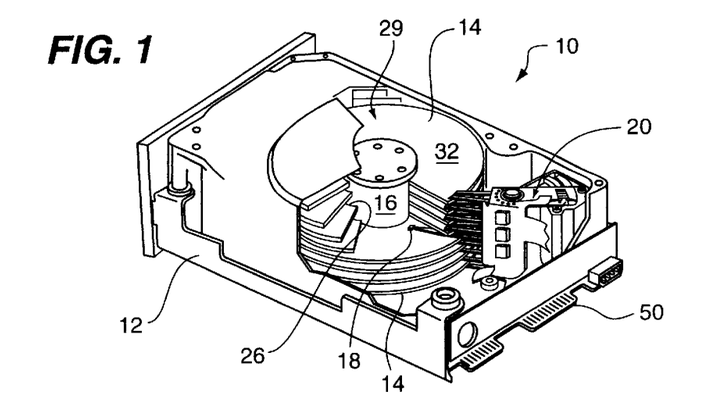
FIG. 1 is a fragmentary perspective view of a head disk assembly in accordance with the present invention with a housing containing a plurality of disk platters, a spindle, and read/write heads.

Referring to FIGS. 1–5, and particularly to FIG. 1, an embodiment of a head disk assembly in accordance with the present invention is depicted. The head disk assembly 10 includes a housing 12 containing a plurality of disk data storage platters 14, a hub or spindle 16, read/write heads 18, and two head actuator mechanisms 20,22.

The platters 14 are provided with a recording medium, and are conventional in configuration and construction with those used in hard disk drives. As such, each platter 14 has two opposing substantially planar faces or sides 24,25 with an open aperture 26 outwardly radially extending from the geometrical center 28 of the platter. The platters 14 may be made from, for example, an aluminum alloy, glass, or a glass-ceramic composite such as MemCor (Dow Corning).

The platters 14 are mounted on the spindle 16 in axial alignment with each other to form a platter stack 29. The spindle 16 passes though the aperture 26 in the planar geometrical center 28 of each platter 14. As such, the spindle 16 extends essentially perpendicular to the planar faces or sides 24,25 of each platter 14.

The platters 14 are stacked in substantially equally spaced vertical relationship to each adjacent platter. Gaps 30 are present between those planar sides 24,25 that face towards adjacent platters 14.

Both sides 24,25 of each platter 14 are covered with a thin layer of a magnetically retentive substance 32 (i.e., recording media) in which magnetic information is stored. For example, the magnetic media 32 may consists of an oxide, such as iron-oxide, or a thin-film.

Both sides 24,25 of each platter 14 have a number of concentric circular recording tracks 34 which extend radially outwardly from the platter's center aperture 26. The same number of recording tracks 34 are located on each side 24,25 of each platter 14. The tracks 34 are uniformly positioned on each side 24,25 of each platter 14 to correspond in spaced overlapping agreement with the tracks on the other platters.

The tracks 34 on each platter 14 are positioned substantially the same distance from the geometrical center 28 of their respective platter as the tracks on the other platters. All platter tracks 34 that are situated substantially the same distance from the center of their respective platter form what is known in the art as a cylinder 36. Accordingly, the recording tracks 34 on the stacked platters 14 form as many cylinders 36 as there are recording tracks 34 on one planer surface of each platter.

Each track 34 is further divided into a plurality of arcuate sectors 38 for storing and retrieving data. Each track 34 has the same number of sectors as every other track. Further, each sector 38 has an arcuate length that is generally equal to that of the other sectors situated on the same recording track 34.

Each sector 38 is bounded by two radii 39,40 of a plurality of radii 41 uniformly extending from the geometrical center 28 of the platter 14 and also from the longitudinal axis of spindle 16. The sectors 38 on each platter 14 are uniformly positioned in spaced overlapping agreement with the sectors 38 on the other platters. Thus, the sectors 38 within each cylinder 36 are in longitudinal axial alignment with each other.

Each sector 38 records the same amount of data. However, because the platters 14 are preferably spun or rotated about the spindle 16 at a constant rate, the sectors 38 on those tracks 34 closer towards the spindle 16 are recorded more densely than sectors located proximate to the outer periphery of each platter 14.

The platters 14 are spun by a conventional internal hub spindle motor (not shown) which is installed within the spindle 16. It is desired that the spindle motor rotate the platters 14 at a precisely controlled speed. The rotational speed may vary from 3,600 to 7,200 RPM, or more, and it is desired that the spindle motor have a conventional control circuit with a feedback loop to precisely monitor and control the speed.

Figure 2:
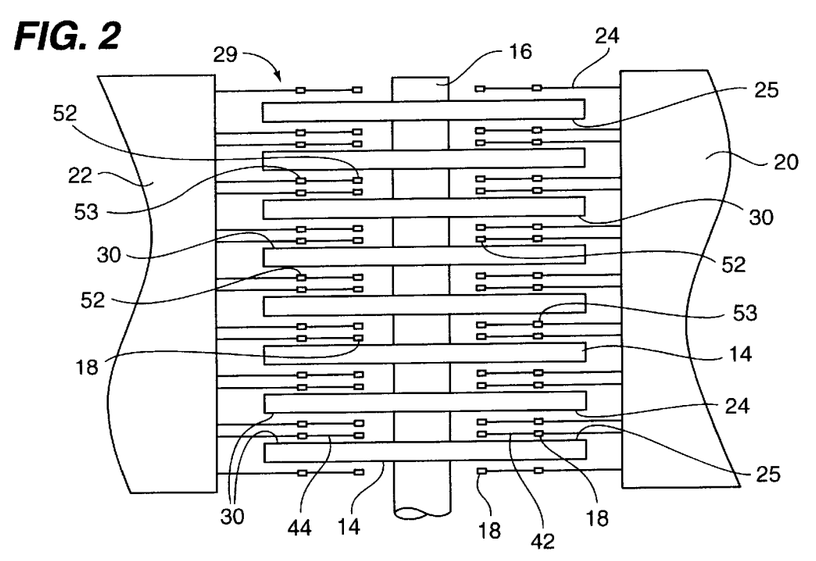
FIG. 2 is a fragmentary side view of the platters depicted in FIG. 1 situated between two head actuator mechanisms.

Substantially symmetrically placed about the stacked platters 14 are the two actuator mechanisms 20,22 for positioning the read/write heads 18 over the platter surfaces 24,25. The actuator mechanisms 20,22 are mounted within the head disk housing 12 such that they lie in a plane which perpendicularly bisects the surfaces 24,25 of all platters 14.

Figure 3:
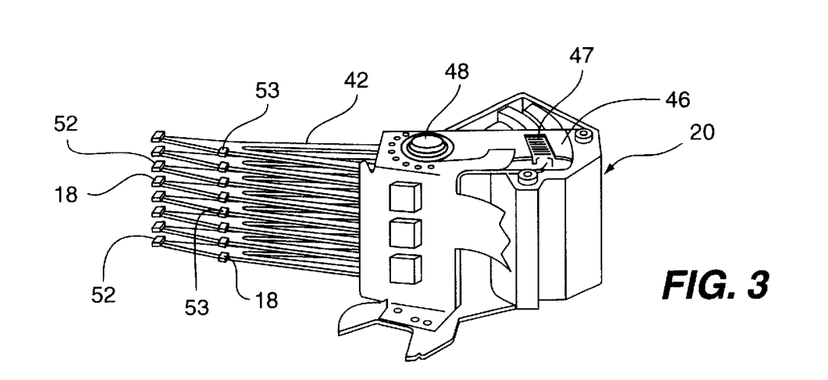
FIG. 3 is a perspective view of one of the actuator mechanism contained within the head disk assembly of FIG. 1.

Extending from actuator mechanisms 20 and 22 are a plurality of actuator arms 42 and 44, respectively. The arms 42,44 associated with each actuator mechanism 20,22 are ganged together and aligned to lie in a single plane that is generally perpendicular to the platter surfaces 24,25. The platters 14 are interstitially positioned between the arms 42,44 such that one arm from each actuator mechanism 20,22 is situated proximate to, and generally in parallel alignment with, one of the platter surfaces 24,25.

Both actuator mechanisms 20,22 are substantially similar to those used in conventional hard disk drives. Preferably each actuator mechanism 20,22 includes a voice coil actuator that uses a stationary magnet 46 and a movable coil 47 attached to the end of the actuator arms. Each actuator mechanism 20,22 operates by the coil 47 being forced to move relative to the stationary magnet 46, such that the ganged together actuator arms are swung out in unison over the surfaces 24,25 of the platters 14 about a fixed actuator shaft 48.

The actuator mechanisms 20,22 are operably connected to a plug connector 50 extending from the head disk assembly housing 12. The actuator mechanisms 20 and 22 are commanded to move the actuator arms 42 and 44, respectively, by a hard disk interface that is coupled to plug connector 50.

Attached to each actuator arm 42,44 are two read/write heads 18. Each head 18 is conventional in design and is capable of electromagnetically reading data from, and writing data to, the sectors 38 on the platters 14. The read/write heads 14 on each arm 42,44 are mounted such that an one head 52, also referred to as the inner head, is positioned on the distal end of the arm. The other head 53, also referred to as the outer head, is located between the actuator mechanism 20,22 and the distal end of the arm.

Both the inner heads 52 and the outer heads 53 on both actuator mechanisms 20,22 are operably connected to the head disk assembly plug connector 50. As such, the electrical signals for reading and writing data are conveyed between the heads 18 and the hard disk interface attached to the plug connector 50 of the head disk assembly 10.

The inner heads 52 on the arms 42,44 of each actuator mechanism 20,22 are aligned with each other to form a line which extends generally perpendicular to the platter surfaces 24,25. Likewise, the outer heads 53 associated with each actuator mechanism 20,22 define another line extending generally perpendicular to the platter surfaces 24,25.

Because the voice coil actuators 20,22 have no click-stops, or detent positions like a stepper motor, it is preferred that the voice coil actuators use a guidance mechanism such as a servo to indicate to the actuators where the heads 18 are in relation to a desired track 34 or cylinder 36 and to accurately place the heads at the desired position. The servo may be a conventional closed loop, servo-controlled mechanism such as a wedge servo, an embedded servo, a dedicated servo, or any other applicable mechanism for positioning the heads 18 of each actuator mechanism 20,22.

Figure 4:
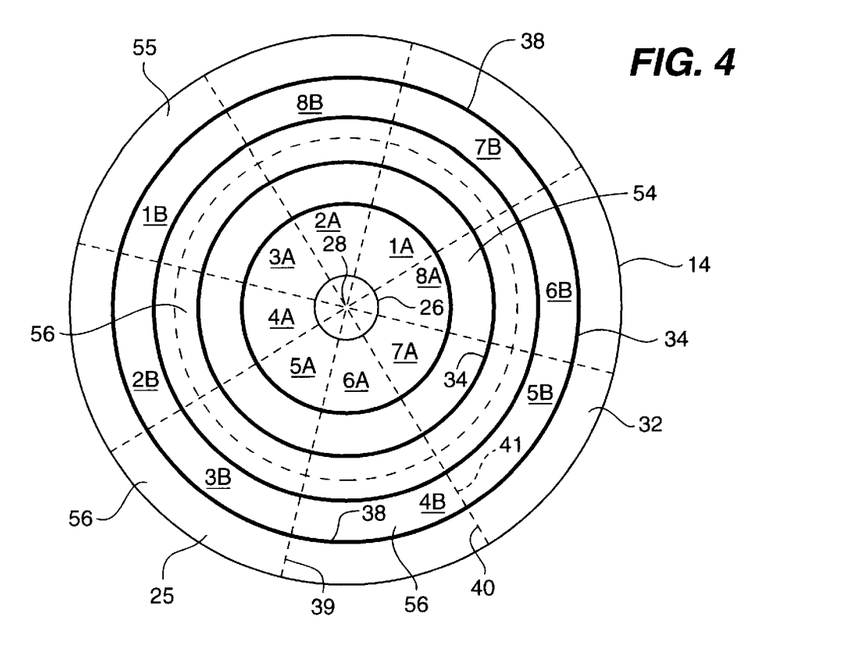
FIG. 4 is a bottom view of one of the platters within the head disk assembly of FIG. 1.
Figure 5:
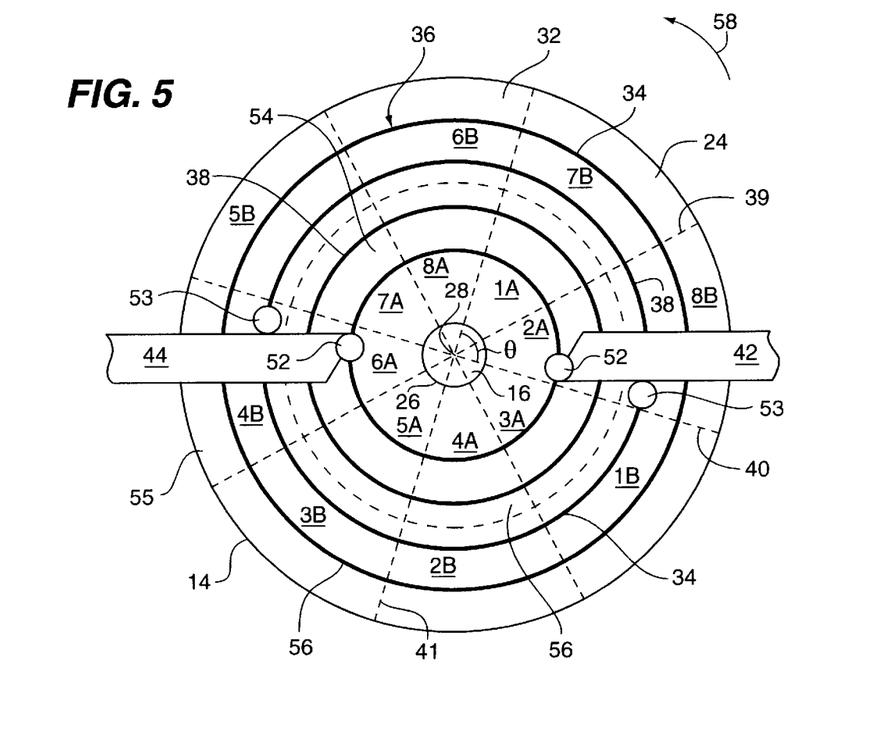
FIG. 5 is a top view of the placement of the heads over one of the platters of FIG. 1.

Referring to FIGS. 4 and 5, a bottom and top view, respectively, of one platter 14 is depicted. Each side 24,25 of each platter 14 has substantially the same configuration as represented by the bottom and top of the platter 14 shown in FIGS. 4 and 5.

In FIGS. 4 and 5, the platter 14 is partitioned into two zones, preferably a first or inner storage zone 54 and a second or outer storage zone 55. Both zones 54,55 contain the same number of tracks 34 on each side 24,25 of each platter 14 with the tracks of the inner zone 54 surrounded by the tracks of the outer zone 55. Thus, the inner zone 54 is positioned between the platter aperture 26 and the outer zone 55.

Each zone 54,55 is divided into sector areas 56 defined by the radii 41 extending from the geometrical center 28 of the platter 14. Between the radii 41 defining each sector area 56 are, preferably, one sector 38 from each track 34. Further, the sector areas 56 on each platter 14 are in vertically alignment with like sector areas on the other platters.

For clarity, but not for purposes of limitation, the sector areas 56 have been consecutively numbered, clockwise on the top surface 24 and counterclockwise on the bottom surface 25, 1a thorough 8a for the inner zone 54 and 1b thorough 8b for the outer zone 55. In the numbering of the sector areas 56, the outer zone numbering is angularly offset by an angle of ninety degrees (90°) relative to the inner zone numbering. For instance, outer sector area 1b is radially aligned with inner sector area 3a, outer sector area 2b is radially aligned with inner sector area 4a, etc.

As stated above, the actuators 20,22 are mounted generally one-hundred and eighty degrees (180°) apart from each other in relation to the planar annular surfaces 24,25 of the platters 14. The heads 18 on each actuator arm 42,44 are situated such that the inner heads 52 can be positioned over any particular track 34, and thus cylinders 36, within the inner zone 54. Likewise, the outer heads 53 can be positioned over any of the tracks 34, and thus cylinders 36, within the outer zone 55. Accordingly, the inner heads 52 and the outer heads 53 of each actuator 20,22 are assigned to read data to, and write data from, the inner zone 54 and the outer zone 55, respectively.

Data is redundantly stored on the platters 14 on both the outer zone 55 and the inner zone 54. The data is read by positioning a read/write head 18, via one of the actuator arms 42,44, over a desired sector 38 within either the inner zone 54 or the outer zone 55. Preferably, original data is stored on the inner zone 54 and a copy of the original data is stored on the outer zone 55.

Referring to FIG. 5, the beginning of the sector containing data on the outer zone 55 is offset relative to the inner zone 54, which contains a copy of the data, by an angle of about ninety degrees (90°). Thus, for example, during rotation of the platter 14 about the center 28 as shown by arrow 58, a copy of the data on sector area 1b of the outer zone 55 is offset by a fixed azimuth angle θ of ninety degrees (90°) relative to the original data contained on sector area 1a of the inner zone 54.

As such, during rotation of the platters 14, a sector containing either the data or a copy of the data is never more than about one-quarter (¼) of the arc-length of the track 34 from arriving at a read/write head 18 on one of the actuator mechanisms 20,22. This results in a latency that is substantially less than the average half-revolution latency of currently available hard disk drives.

Figure 6:
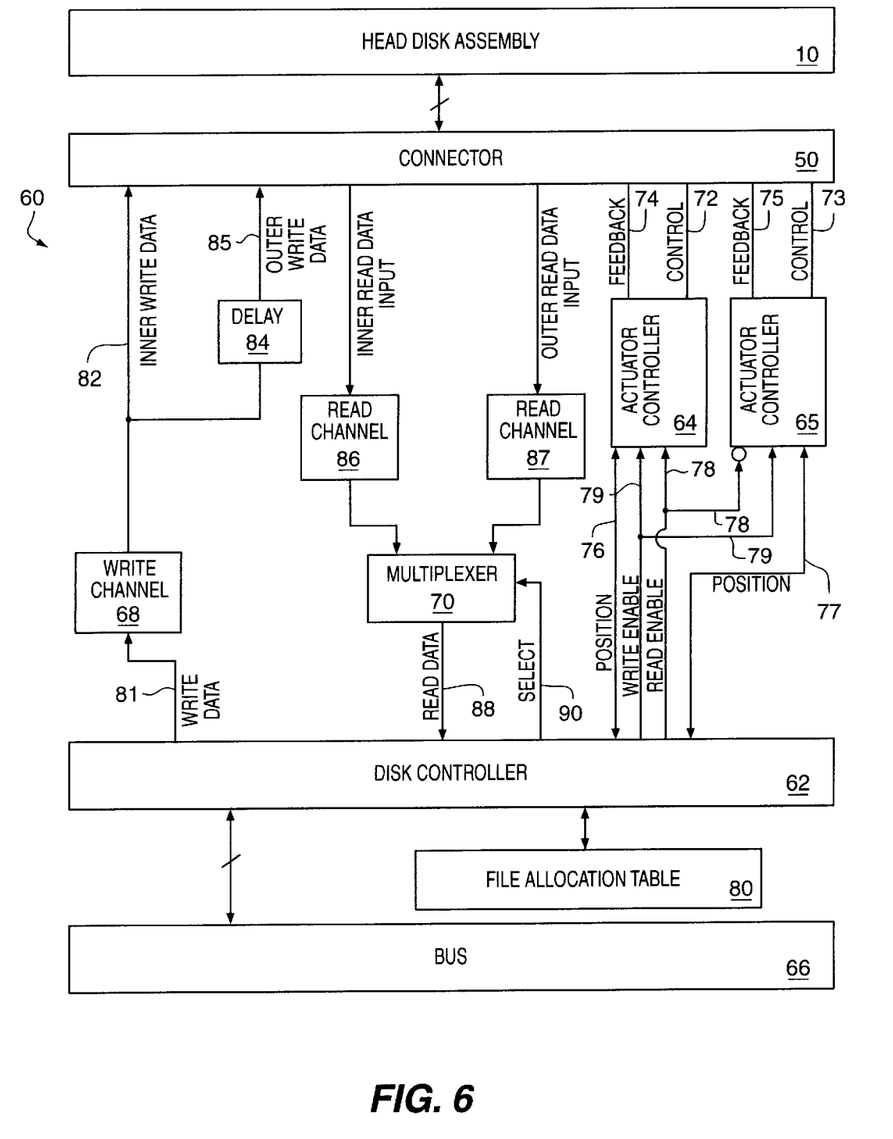
FIG. 6 is a block diagram illustrating a hard disk interface coupled to the head disk assembly of FIG. 1 for controlling the writing and reading of data to and from the head disk assembly.

Turning to FIG. 6, a block diagram is depicted of the hard disk interface coupled to the head disk assembly of FIG. 1 for controlling the writing and reading of data. Within FIG. 6, a single block may indicate several individual components and/or circuits which collectively perform a single function. Likewise, a single line may represent several individual signal or energy transmission paths for performing a particular operation.

The hard disk interface 60 includes a disk controller 62 and two actuator controllers 64,65. The disk controller 62 is coupled to a bus 66 from a host (not shown), a write channel 68, both actuator controllers 64,65, and a data multiplexer 70. The disk controller 62 intermediates the passage of data between the head disk assembly 10 and the bus 66. To this end, the disk controller 62 maintains an interface with the bus 66 and issues commands to the actuator controllers 64,65 for locating where data is either to be read or written on the platters 14 within the head disk assembly 10.

The actuator controllers 64,65 are coupled between the disk controller 62 and the head disk assembly 10. Each actuator controller 64,65 is operably connected to one of the actuators 20,22 within the head disk assembly 10 to provided control signals 72,73. Thus, both actuator controllers 64,65 determine and control the position of the heads 18 on the arms 42,44 extending from the actuator 20,22 under their control.

Preferably, both actuator controllers 64,65 receive feedback signals 74,75 from their respective actuator 20,22 for accurately positioning the heads 18 on the actuator arms 42,44 via the control signals 72,73. Further, the feedback 74,75 is used by the actuator controllers 64,65 to provide information 76,77 on the position of the heads 18 in relation to each sector area 56. The positioning information 76,77 is relayed to the disk controller 62 for calculating the time before the heads 18 on each actuator 20,22 can be positioned over a particular sector 38.

A read enable signal 78 is generated by the disk controller 62 for enabling one of the actuator controllers 64,65 to read data from the platters 14, while disabling the other actuator controller. Further, the actuator controllers 64,65 are enabled to write data to the platter 14 by a write enable signal 79 issued by the disk controller 62.

As shown in FIG. 6, the disk controller 62 maintains a file allocation table 80 to keep track of where the data is stored on the inner zone 54 and the outer zone 55 of each platter 14. Accordingly, during a read request to get data from the head disk assembly 10, the controller 62 makes a determination as to which actuator 20,22 can position its read/write heads 18 the quickest for obtaining the requested data. The controller 62 makes the determination based on the positioning status 76,77 provided by the actuator controllers 64,65 and the file location information within the file allocation table 80.

Coupled between the disk controller 62 and the head disk assembly 10 is the write channel 68 for transmitting data 81 from the disk controller 62 onto one or more of the platters 14 within the head disk assembly. The write data 81 received by the write channel 68 is written onto both inner zone 54 and the outer zone 55 of one or more platters 14.

Preferably, the write channel 68 processes the data 81 into an original or inner write data signal 82 that is written directly onto the inner zone 54 via the inner heads 52 attached to one of the actuators 20,22. The original data signal 82 transmitted from the write channel 68 also is received by a delay 84 which processes the data signal into a copy or outer write data signal 85 that is written onto the outer zone 55, via the outer heads 53 attached to one of the actuators 20,22. Preferably, the data 85 from delay 84 is written onto the outer zone 55 after the platters 14 have rotated approximately ninety degrees (90°) such that data written on outer zone 55 is offset by an angle of about ninety degrees (90°) relative to the original data contained on the inner zone 54. The delay 84 for offsetting the location of where the data is redundantly stored may consists of a first in first out (FIFO) buffer or other like means for delaying the transmission of the data onto the platters 14.

As stated above, multiplexer 70 is coupled to the disk controller 62. The multiplexer 70 receives data from read channels 86 and 87 which are operably connected to the head disk assembly 10. The data from read channel 84 consists of data read from the outer zone 55. Likewise, the data from read channel 85 consists of data read from the inner zone 54.

The multiplexer 70 provides a read data output 88, which is selected by select signal 90 transmitted from the disk controller 62, to consist of data transferred either from read channel 84 or 85.

When a command is placed on the bus 66 for the retrieval of data from the head disk assembly 10, the disk controller 62 receives the command from the bus. The disk controller 62 then checks the file allocation table 80 to determine the position of the data on both the inner zones 54 and outer zones 55 of the platters 14. In addition, the disk controller 62 checks the positioning status 76,77 from the actuator controllers 72,73. The positioning status is used by the controller 62 to determine which actuator 20,22 is the closest to, and thus would be the quickest in, placing its heads 18 over a particular sector containing the data or a copy thereof.

Upon determining the actuator 20,22 with the closest heads 18, the disk controller 62 enables the closest actuator and disables the other actuator via the read enable signal 78. Further, the disk controller 62 commands the multiplexer 70 with the select signal 88 to provide data from the read channel 86,87 receiving data from the actuator 20,22 used in reading the data from the platters 14. The data is then read from the platters 14 and transferred by the disk controller 62 onto the bus 66.

During a write command, the disk controller 62 refers to the file allocation table 80 for determining where the data can be stored on the platters 14. Because data is redundantly stored on both zones 54,55 of the platters 14, the data stored on inner zone 54 is also stored on the outer zone 55, but offset by 90 degrees (90°) relative to each other.

The disk controller 62 enables both actuator controllers 64,65 for writing the data onto the zones 54,55 of the platters 14. The data is then transferred from the disk controller 62 to the write channel 68 where the data is written directly onto the inner zone 54. Further, the data is passed though the delay 82 and then written onto the outer zone 55 after the platters 14 have had sufficient time to rotate about ninety degrees (90°). Thus, the data is redundantly written on the outer zone 55 and offset relative to the inner zone 54 by an angle of approximately ninety degrees (90°). In addition, the disk controller updates the file allocation table 80 to include the location of the newly written data on the inner and outer zones of the platters 14.

Figure 7:
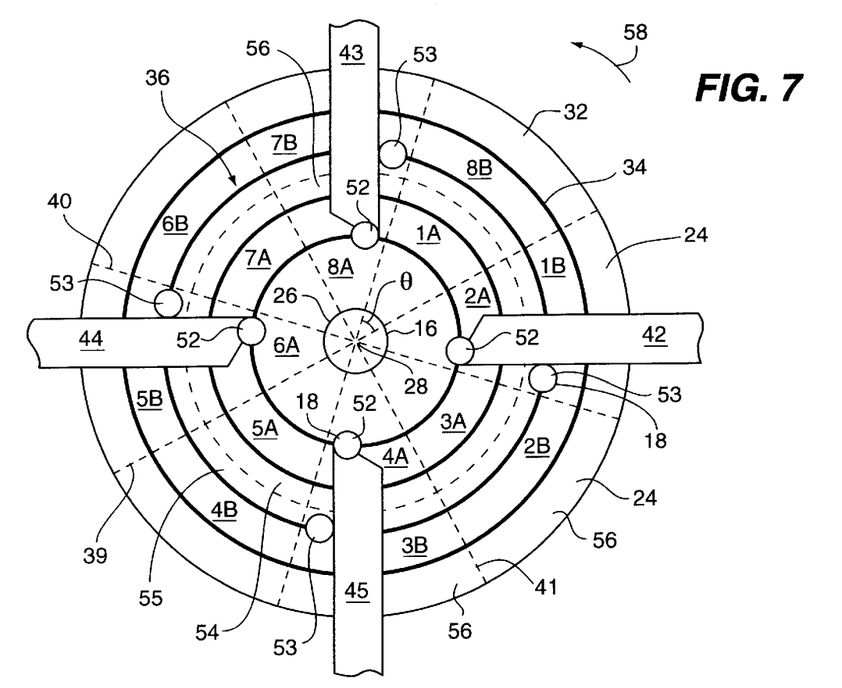
FIG. 7 is a further embodiment of the present invention which provides a top view of the heads from four actuator mechanisms positioned over one platter.

Turning to FIG. 7, an alternative embodiment of the present invention is depicted wherein four actuator mechanisms, as shown in FIG. 3, are used to position heads over platter 14. The actuator mechanisms are substantially symmetrically placed about the platter to position their respective actuator arms 42, 43, 44, and 45 over the platter surface 24.

As stated previously, attached to each actuator arm 42–45 are two read/write heads 18. The read/write heads 14 are attached to each arm 42–45 such that an inner read/write head 52 is mounted on the distal end of the arm. Further, an outer head 53 is mounted remotely from the arm distal end.

Like the platter of FIGS. 4 and 5, the platter of FIG. 7 is partitioned into two zones consisting, preferably of an inner zone 54 and an outer zone 55. Both zones 54,55 contain the same number of tracks 34 with the tracks of the inner zone 54 surrounded by the tracks of the outer zone 55. The zones 54,55 are further divided into sector areas 56 defined by radii 41 extending from the geometrical center 28 of the platter 14.

The sector areas 56 are consecutively numbered, clockwise, 1a thorough 8a for the inner zone 54, and 1b thorough 8b for the outer zone 55. However, the outer zone numbering is offset by an angular displacement of forty-five degrees (45°) relative to the inner zone numbering.

Likewise, the actuators around the platter 14 are mounted generally at ninety degree (90°) intervals about the planar annular surface 24 of the platter 14. As such, the inner heads 52 on each actuator arm 42–55 can be positioned over any particular track 34 within the inner zone 54. Likewise, the outer heads 53 can be positioned over any of the tracks 34 within the outer zone 55. Further, the inner heads 52 and the outer heads 53 of each actuator arm 42–45 are assigned to read data to, and write data from, the inner zone 54 and the outer zone 55, respectively.

Substantially the same data is stored on both the outer zone 55 and the inner zone 54 of the platter 14. Accordingly, the data is read by positioning a read/write head 18, via one of the actuator arms 42–45, over a desired sector 38 within either the inner zone 54 or the outer zone 55.

Data written on the sectors within the outer zone 55 is offset relative to like data on the inner zone 54 by an angle of about forty-five degrees (45°) such that, for instance, data on sector area 1a of the inner zone is also contained on sector 1b of the outer zone. Thus, during rotation of the platter 14 about the center 14 in the counterclockwise direction shown by arrow 58, the data on sector area 1b of the outer zone 55 is offset by a fixed azimuth angle θ of forty-five degrees (45°) relative to like data contained on sector area 1a of the inner zone 54. Thus, during rotation of the platter 14, a sector containing a copy of the data is never more than about one-eighth (⅛) of the arc-length of the track 34 from arriving at a read/write head 18 on one of the actuator arms 42–45.

Preferably, actuator controllers are used in determining and controlling the position of the heads 18 on the arms 42,44 extending from each actuator mechanisms. Positioning information from the actuator controller is provided to the disk controller for calculating the time before the heads 18 on each actuator arm 42–45 can be positioned over a particular sector 38. Thus, the disk controller can determine which arm 42–45 would be the most expedient in placing its heads 18 over a particular sector containing the requested data or a copy thereof.

Referring to FIGS. 8–11, an alternative embodiment of the present invention is depicted wherein data is redundantly stored at angularly offset positions on two or more platters. In FIGS. 8–11, the last two digits of the 100-series of numerals depict structural elements that are similar in function to those described, and thus similarly numbered, with regard to FIGS. 1–7.

Figure 8:
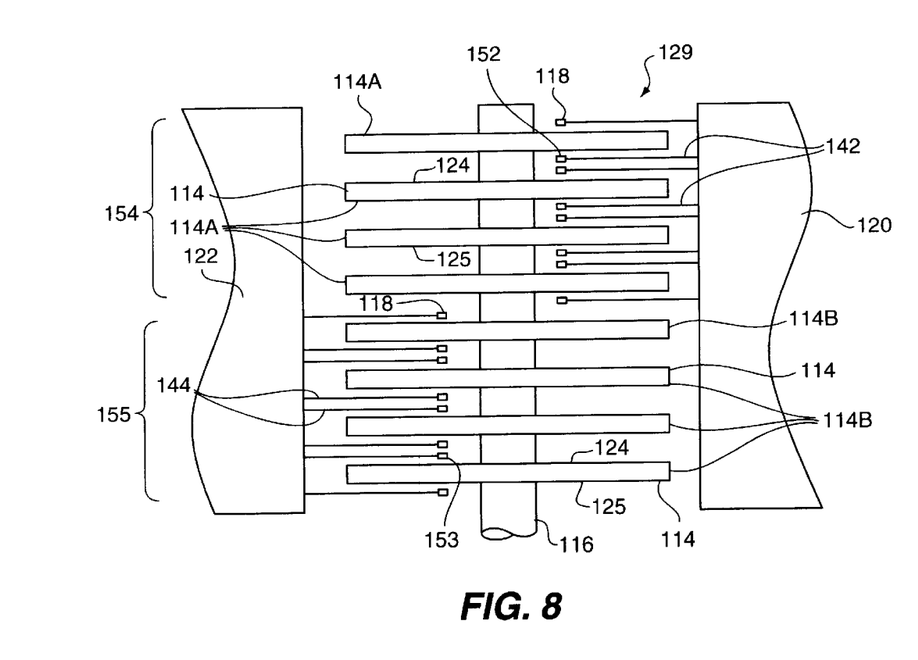
FIG. 8 is another embodiment of the present invention providing a side view of a stack of platters positioned between two actuator mechanisms.
Figure 9:
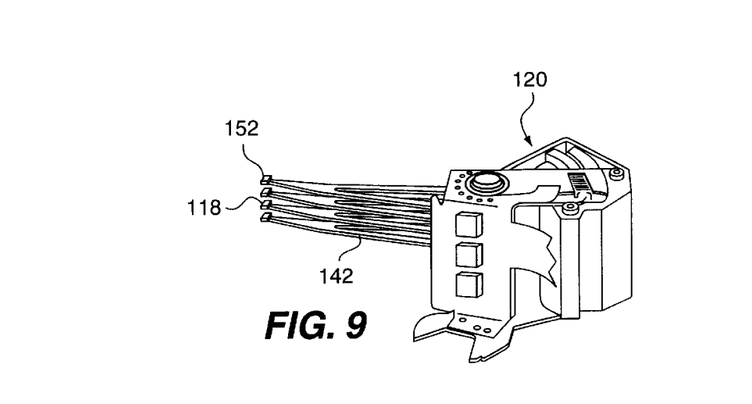
FIG. 9 is a perspective view of one of the actuator mechanisms of FIG. 8.
Figure 10:
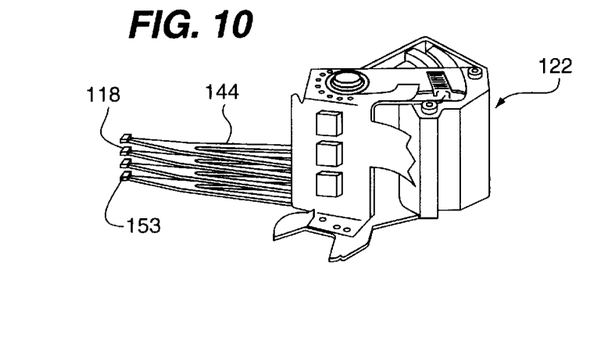
FIG. 10 is a perspective view of the other actuator mechanism within FIG. 8.

Turning to FIGS. 8–10, platters 114 are mounted on spindle 116 in axial alignment with each other to form stack 129. The platters 114 are substantially identical to each other. Preferably, an even number of platters 114 are mounted onto the spindle 116 with half of the platters (i.e., four) being designated by reference numbers 114a and the other half of the platters (i.e., four) being designated by reference numbers 114b.

Substantially symmetrically placed about the stack 129 of platters 114 are actuator mechanisms 120 and 122 for positioning read/write heads 118 over the platter surfaces 124,125 of platters 114a and 114b, respectively. Extending from actuator mechanism 120 are a plurality of actuator arms 142. Likewise, a plurality of actuator arms 144 extend from actuator 122. The arms 142,144 associated with each actuator mechanism 120,122 are ganged together and aligned to lie in a single plane that is generally perpendicular to the platter surfaces 124,125. The platters 114 are positioned between the arms 142,144 such that one arm from an actuator mechanism 120,122 is situated proximate to, and in generally parallel alignment with, one of the surfaces 124, 125 of each platter 114.

In particular, one arm 142 from actuator mechanism 120 is positionable over each surface 124,125 of platters 114a. Further, one arm 144 from actuator mechanism 122 is positionable over each surface 124,125 of platters 114b.

As indicated previously, attached to the distal end of each arm 142 extending from actuator mechanism 120 is a read/write head 152, also referred to hereinafter as an upper head, which provides for reading data from, and writing data to, sectors on both sides 124,125 of platters 114a. Likewise, a read/write head 153, also referred to hereinafter as a lower head, is mounted on the distal end of each arm 144 from actuator mechanism 122 for reading and writing data both to and from sectors on both sides 124,125 of platters 114b.

Preferably, the heads 152 on the arms 142 of actuator mechanism 120 are aligned with each other to form a line which extends generally perpendicular to the surfaces 124, 125 of platters 114a. Likewise, the heads 153 associated with actuator mechanism 122 define another line extending generally perpendicular to the surfaces 124,125 of platters 114b.

Figure 11:
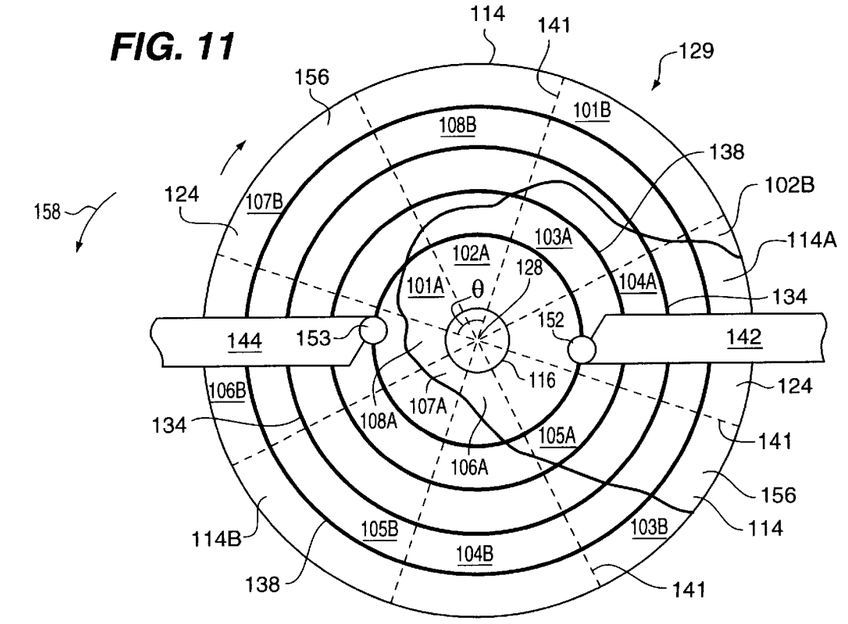
FIG. 11 is a fragmentary top view of the stack of platters depicted in FIG. 8 illustrating the placement of read/write heads over two of the platters.

Referring to FIG. 11, a fragmentary top view is depicted of the platter stack 129 of FIG. 8. In FIGS. 8 and 11, the platters 114 are divided into a first or upper storage zone 154, constituted by platters 114a, and a second or lower storage zone 155, constituted by platters 114b. Both storage zones 154,155 contain the same number of platters 114 with the platters 114a of the upper storage zone 154 placed above the platters 114b of the lower storage zone 155.

Each platter 114 within both the upper storage zone 154 and the lower storage zone 155 is divided into sector areas 156 defined by radii 141 extending from the platter geometrical center 128. Preferably, one sector 138 from each track 134 is bounded between the two radii 141 defining each sector area 156. Further, the sector areas 156 on each platter 114 are in vertically alignment with like sector areas on the other platters.

In FIG. 11, the sector areas 156 have been consecutively clockwise numbered on the top surface 124 of the platters 114, 101a thorough 108a for the upper storage zone 154 and 101b thorough 108b for the lower storage zone 155. In numbering the sector areas 156, the lower storage zone numbering is angularly offset by an angle of ninety degrees (90°) relative to the upper zone numbering. For instance, sector area 101b on platter 114b is radially aligned with sector area 103a on platter 114a, sector area 102b on platter 114b is radially aligned sector area 104a on platter 114a, etc.

The actuator mechanisms 120 and 122 are mounted generally one-hundred and eighty degrees (180°) apart from each other in relation to the planar annular surfaces 124,125 of the platters 114. The heads 152 on each actuator arm 142 of mechanism 120 are situated such that they can be positioned over the tracks 134, and thus cylinders, within the upper storage zone 154. Likewise, the heads 153 on each actuator arm 144 of mechanism 122 can be positioned over any of the tracks 134, and thus cylinders, within the lower storage zone 155. Accordingly, the upper heads 152 and the lower heads 153 of the actuators 120,122 are assigned to read data to, and write data from, the platters 114 of the upper storage zone 154 and the lower storage zone 155, respectively.

Substantially the same data is stored on the platters 114 of both the upper storage zone 154 and the lower storage zone 155. Accordingly, the data is read by positioning a read/write head 118, via one of the actuator arms 142,144, over a desired sector 138 within either the upper storage zone 154 or the lower storage zone 155.

Preferably, referring to FIG. 11, data written on the sector areas 156 within the lower zone 155 is offset relative to like data on the sector areas of the upper zone 154 by an azimuth angle θ of about ninety degrees (90°). For example, a copy of data contained on sector area 101a of the upper zone 154 is written on sector area 101b of the lower zone. Thus, during rotation of the platters 114 in the counterclockwise direction 158 about spindle 116, a sector area containing the data, or a copy thereof, is always within at least approximately one-quarter (¼) of the arc-length of the track 134 from arriving at a read/write head 118 mounted on one of the actuator mechanisms arms 142,144.

It will be readily apparent to one skilled in the art from the foregoing detailed description of the invention and from the illustrations thereof that numerous variations and modifications may be effected without departing from the true spirit and scope of the novel concepts or principles of this invention.

What is claimed is:

1. A data storage device comprising:

(a) a platter having a substantially planar annular surface with a geometrical center;

(b) a plurality of generally arcuate concentric tracks on said surface, said tracks divided into a plurality of sector areas by radii extending from said center;

(c) original data written on at least one of said sector areas;

(d) a substantially redundant copy of said original data offset from said original data by a fixed azimuth angle during rotation of said platter about said center;

(e) at least four actuator mechanisms, each of the actuator mechanisms having an actuator arm and at least two heads for reading the original data and the copy; wherein said platter is partitioned into an inner zone and an outer zone with said inner zone containing said original data and said outer zone containing said copy; and four actuator mechanisms are symmetrically positioned about said platter.

2. A data storage device comprising:

(a) a spindle;

(b) a platter attached to said spindle, said platter having a planar annular surface with a geometrical center;

(c) a plurality of generally arcuate concentric tracks on said surface, said tracks divided into sector areas;

(d) original data written on at least one of said sector areas;

(e) a substantially redundant copy of said original data offset from said original data by a fixed azimuth angle during rotation of said platter about said spindle;

(f) at least four actuator mechanisms positioned about said platter, each of said actuator mechanisms having an actuator arm and heads for reading said data; wherein said platter is partitioned into an inner zone and an outer zone with said inner zone containing said original data and said outer zone containing said copy; and four actuator mechanisms are symmetrically positioned about said platter.

* * * * *